(12) United States Patent
Tehrani

(10) Patent No.: US 11,952,451 B2
(45) Date of Patent: *Apr. 9, 2024

(54) LATEXES WITH PH RESPONSIVE RESIN PARTICLES

(71) Applicant: Xerox Corporation, Norwalk, CT (US)

(72) Inventor: Sepehr M. Tehrani, North York (CA)

(73) Assignee: Xerox Corporation, Norwalk, CT (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/386,013

(22) Filed: Jul. 27, 2021

(65) Prior Publication Data

US 2023/0053177 A1    Feb. 16, 2023

(51) Int. Cl.
| | | |
|---|---|---|
| *C08F 220/26* | (2006.01) | |
| *C08F 2/24* | (2006.01) | |
| *C08F 212/08* | (2006.01) | |
| *C08F 220/06* | (2006.01) | |
| *C08F 220/18* | (2006.01) | |
| *C08F 220/28* | (2006.01) | |
| *C08F 224/00* | (2006.01) | |
| *C08L 33/10* | (2006.01) | |
| *C09J 133/10* | (2006.01) | |
| *C08F 20/26* | (2006.01) | |
| *C08F 20/28* | (2006.01) | |
| *C08F 24/00* | (2006.01) | |

(52) U.S. Cl.
CPC ............ *C08F 224/00* (2013.01); *C08F 2/24* (2013.01); *C08F 212/08* (2013.01); *C08F 220/06* (2013.01); *C08F 220/1804* (2020.02); *C08F 220/282* (2020.02); *C08L 33/10* (2013.01); *C09J 133/10* (2013.01); *C08F 20/26* (2013.01); *C08F 20/28* (2013.01); *C08F 24/00* (2013.01); *C08F 2800/20* (2013.01); *C08L 2201/52* (2013.01); *C08L 2205/18* (2013.01)

(58) Field of Classification Search
CPC .... C08F 224/00; C08F 220/282; C08F 24/00; C08F 20/26; C08F 20/28
See application file for complete search history.

(56) References Cited

U.S. PATENT DOCUMENTS

| | | | |
|---|---|---|---|
| 4,923,919 A | 5/1990 | Frazee | |
| 5,461,103 A | 10/1995 | Bafford et al. | |
| 5,468,800 A * | 11/1995 | Folsch | D06M 15/423 |
| | | | 524/568 |
| 6,020,416 A * | 2/2000 | Mazur | C08L 57/00 |
| | | | 525/218 |
| 8,728,455 B2 | 5/2014 | Konradi et al. | |
| 9,090,736 B2 | 7/2015 | Schwalm et al. | |
| 9,371,464 B2 | 6/2016 | Breton et al. | |
| 9,862,788 B2 | 1/2018 | Hilf et al. | |
| 2003/0029355 A1* | 2/2003 | Miyabayashi | C09D 11/40 |
| | | | 106/31.27 |
| 2006/0038867 A1 | 2/2006 | Valentini | |
| 2007/0099814 A1 | 5/2007 | Tamori et al. | |
| 2008/0186373 A1 | 8/2008 | Rolly | |
| 2011/0312240 A1* | 12/2011 | Amthor | C09D 133/066 |
| | | | 525/328.4 |
| 2011/0318551 A1 | 12/2011 | Nakagawa | |
| 2013/0289171 A1* | 10/2013 | Miller | D06M 15/263 |
| | | | 524/53 |
| 2016/0090495 A1 | 3/2016 | Suzuki | |
| 2016/0122597 A1 | 5/2016 | Xiao et al. | |
| 2018/0273778 A1 | 9/2018 | Saito et al. | |
| 2019/0031638 A1 | 1/2019 | Beyer et al. | |
| 2019/0367753 A1 | 12/2019 | Chopra et al. | |
| 2022/0363920 A1 | 11/2022 | Veregin et al. | |
| 2023/0046647 A1 | 2/2023 | Moffat et al. | |
| 2023/0051056 A1 | 2/2023 | Moffat et al. | |
| 2023/0055456 A1 | 2/2023 | Tehrani et al. | |
| 2023/0073050 A1 | 3/2023 | Duquenne et al. | |
| 2023/0100354 A1 | 3/2023 | Moffat et al. | |

FOREIGN PATENT DOCUMENTS

| | | | |
|---|---|---|---|
| CN | 107446457 | | 12/2017 |
| CN | 111087540 A | * | 5/2020 |
| EP | 1921509 A1 | | 5/2002 |
| EP | 1609827 A1 | | 12/2005 |
| EP | 1108758 B1 | | 7/2006 |
| EP | 2546313 | | 1/2013 |
| EP | 2913186 A1 | | 9/2015 |
| EP | 2823002 B1 | | 5/2016 |
| EP | 1756237 B1 | | 5/2017 |
| EP | 3360907 | | 8/2018 |

(Continued)

OTHER PUBLICATIONS

International Agency for Research on Cancer "N-methylolacrylamide" 1994 IARC Monographs on the Evaluation of Carcinogenic Risks to Humans, No. 60 accessed online on May 6, 2023 (Year: 1994).*

(Continued)

*Primary Examiner* — Ling Siu Choi
*Assistant Examiner* — David L Miller
(74) *Attorney, Agent, or Firm* — Bell & Manning, LLC

(57) ABSTRACT

Latexes are provided which may comprise water and resin particles comprising a polymerization product of reactants comprising a dioxane/dioxolane monomer and an additional monomer, wherein the dioxane/dioxolane monomer is an ester of (meth)acrylic acid with an alcohol comprising a dioxane moiety, an ester of (meth)acrylic acid with an alcohol comprising a dioxolane moiety, or both.

14 Claims, No Drawings

(56) References Cited

FOREIGN PATENT DOCUMENTS

| | | |
|---|---|---|
| EP | 3494954 | 6/2019 |
| EP | 3494182 B1 | 4/2020 |
| JP | H0762035 A | 3/1995 |
| JP | H0772660 A | 3/1995 |
| JP | 2018/039936 A | 3/2018 |
| WO | WO2014/042653 | 3/2014 |
| WO | WO2015091318 | 6/2015 |
| WO | WO 2015/158649 | 10/2015 |
| WO | WO 2013/189746 A1 | 12/2016 |
| WO | WO 2017/134002 | 8/2017 |
| WO | WO2018/087287 A1 | 5/2018 |
| WO | WO2018/143957 | 8/2018 |
| WO | WO2018/143959 | 8/2018 |
| WO | WO2018/143962 | 8/2018 |
| WO | WO2018/158436 A1 | 9/2018 |
| WO | WO 2020/194136 | 10/2020 |
| WO | WO 2021/099943 | 5/2021 |

OTHER PUBLICATIONS

Mckenzie, Andrew, et al. "Core (polystyrene)-Shell [poly (glycerol monomethacrylate)] particles." ACS Applied Materials & Interfaces 9.8 (2017): 7577-7590.

Extended European Search Report for EP 22184483 dated Dec. 5, 2022; pp. 1-15.

Evonik launches VISIOMER® GLYFOMA, a low-odor reactive diluent—Evonik PDF press release, available from web as of Jul. 13, 2021 at https://methyl-methacrylate-monomers.evonik.com/en/evonik-launches-visiomer-glyfoma-a-low-odor-reactive-diluent-96754.html.

* cited by examiner

LATEXES WITH PH RESPONSIVE RESIN PARTICLES

BACKGROUND

Latexes for aqueous inkjet ink compositions are often synthesized through emulsion polymerization or microemulsion polymerization of hydrophobic monomers in water. The latexes are added to the aqueous inkjet ink compositions along with water, water-dispersible colorants, and hydrophilic solvents. The resin particles of the latex act as a binder which help form a water-impenetrable, polymeric film that protects printed images. In order to tune the viscosity of the aqueous inkjet ink compositions, water-soluble resins are often added to the ink compositions. However, water-soluble resins can induce flocculation and aggregation of resin particles as well as interfere with their electrostatic stability. Water-soluble resins also reduce the water-fastness of images printed from the aqueous inkjet ink compositions.

SUMMARY

The present disclosure provides latexes, which may be used to provide resin particles for a variety of compositions such as ink compositions and adhesives. The resin particles are polymerized from dioxane/dioxolane monomers. Embodiments of the present resin particles exhibit a pH responsivity that is leveraged to provide improved latexes and related compositions. For example, embodiments of the resin particles have a size that is pH dependent, including exhibiting a larger size at higher pH values. The viscosity of latexes comprising such resin particles is also pH dependent, including exhibiting a greater viscosity at higher pH values. This feature allows the resin particles to be synthesized at low pH values and low viscosities. Then, the ink compositions can be made at higher pH values at the desired viscosities using relatively low amounts of resin particles. Furthermore, although they may be used, no water-soluble resins or silica additives are necessary for viscosity adjustment. In view of this unique pH responsivity, in the present disclosure, embodiments of the resin particles, latexes, and related compositions may be referred to as being "pH responsive." Ink compositions comprising embodiments of the resin particles also exhibit extended open-air stability, facilitating the collection of waste ink from open-air waste trays of aqueous inkjet systems. Finally, embodiments of the resin particles also exhibit relatively high glass transition temperatures ($T_g$). Although high $T_g$ values are desirable for stability, mar resistance, reduced tackiness, and offset transfer, this property is also known to negatively affect gloss differential and adhesion. Surprisingly, ink compositions comprising embodiments of the high $T_g$ resin particles exhibit low gloss differential values and high adhesion, including excellent water fastness.

In embodiments, a latex is provided which comprises water and resin particles comprising a polymerization product of reactants comprising a dioxane/dioxolane monomer and an additional monomer, wherein the dioxane/dioxolane monomer is an ester of (meth)acrylic acid with an alcohol comprising a dioxane moiety, an ester of (meth)acrylic acid with an alcohol comprising a dioxolane moiety, or both.

In other embodiments, an adhesive is provided which comprises a layer of resin particles on a surface of a substrate, the resin particles comprising a polymerization product of reactants comprising a dioxane/dioxolane monomer and an additional monomer, wherein the dioxane/dioxolane monomer is an ester of (meth)acrylic acid with an alcohol comprising a dioxane moiety, an ester of (meth)acrylic acid with an alcohol comprising a dioxolane moiety, or both.

Other principal features and advantages of the disclosure will become apparent to those skilled in the art upon review of the following drawings, the detailed description, and the appended claims.

DETAILED DESCRIPTION

Latex

In one aspect, latexes are provided. Such a latex comprises resin particles synthesized from various monomers, forming a polymeric material from which the resin particles are composed. At least one type of monomer is used which is an ester of (meth)acrylic acid with an alcohol comprising a dioxane moiety or an alcohol comprising a dioxolane moiety. (The use of "(meth)" as in, e.g., "(meth)acrylic acid", refers to both acrylic acid and methacrylic acid.) In the present disclosure, this type of monomer may be referred to as an "dioxane/dioxolane monomer." This phrase, dioxane/dioxolane monomer, encompasses the monomer which is the ester of (meth)acrylic acid with the alcohol comprising the dioxane moiety, the monomer which is the ester of (meth)acrylic acid with the alcohol comprising the dioxolane moiety, and both such monomers. The dioxane moiety may be a 1,3-dioxane moiety and the dioxolane moiety may be a 1,3-dioxolane moiety. The alcohol comprising the dioxane/dioxolane moiety may be an acetal of a triol, a ketal of a triol, or a carbonate of a triol. Illustrative triols include glycerol and trimethylolpropane. The triol may be unsubstituted or substituted. By "substituted" it is meant that one or more bonds to a carbon(s) or hydrogen(s) are replaced by a bond to non-hydrogen and non-carbon atoms. The dioxane/dioxolane monomer may have Formula I (dioxane) or II (dioxolane) as shown below, wherein R is selected from hydrogen and methyl; R' is selected from hydrogen and ethyl; and Z is selected from hydrogen, an oxygen of a carbonyl group, an alkyl group, an aryl group, and an alkoxy group. Either or both types of monomers may be used in the resin particles.

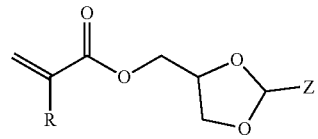

Formula I

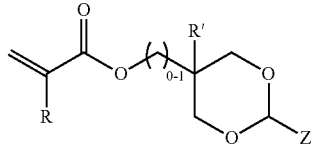

Formula II

The carbonyl group refers to a C=O group, that is Z is O covalently bound to the carbon via a double bond, thereby forming a carbonyl group between the two oxygens of the 5 or 6-membered ring. The alkyl group may be linear or branched. The alkyl group may have from 1 to 20 carbons. This includes having from 1 to 18 carbons and from 1 to 10 carbons, e.g., 1, 2, 3, 4, 5, 6, 7, 8, 9, or 10 carbons. The alkyl group may be substituted or unsubstituted. The aryl group may be monocyclic having one aromatic ring, e.g., benzene, or polycyclic having one or more fused rings. The aryl group may be unsubstituted or substituted as described above with respect to the alkyl group, although substituted aryl groups also encompass aryl groups in which a bond to a hydrogen(s) is replaced by a bond to an unsubstituted or substituted alkyl group as described above. The alkoxy group refers to an —O-alkyl group.

Illustrative dioxane/dioxolane monomers include glycerol formal (meth)acrylate, trimethylolpropane formal (meth)acrylate, and isopropylideneglycerol (meth)acrylate. A single type or combinations of different types of dioxane/dioxolane monomers may be used. In embodiments, however, the dioxane/dioxolane monomer is glycerol formal (meth)acrylate. Glycerol formal (meth)acrylate has a relatively high $T_g$ (about 85-90° C.). In the present disclosure, the name "glycerol formal (meth)acrylate" (as well as the names of the other dioxane/dioxolane monomers described in this paragraph) refers to either the dioxane isomer, the dioxolane isomer, or both. That is, all possibilities are encompassed by the names.

At least embodiments of the dioxane/dioxolane monomers are amphiphilic. This is by contrast to hydrophilic monomers which have a high affinity for polar solvents such as water but have limited affinity for nonpolar solvents such as hydrocarbons, ethers, and esters.

Generally, an additional monomer is used to form the resin particles. Various types of monomers may be used such as styrene; alkyl (meth)acrylates, such as, methyl acrylate, ethyl acrylate, butyl acrylate, isobutyl acrylate, dodecyl acrylate, n-octyl acrylate, 2-chloroethyl acrylate, methyl methacrylate, ethyl methacrylate and butyl methacrylate; (β-carboxy ethyl acrylate (β-CEA), phenyl acrylate, methyl alphachloroacrylate; butadiene; isoprene; methacrylonitrile; acrylonitrile; vinyl ethers, such as vinyl methyl ether, vinyl isobutyl ether, and vinyl ethyl ether; vinyl esters, such as vinyl acetate, vinyl propionate, vinyl benzoate and vinyl butyrate; vinyl ketones, such as vinyl methyl ketone, vinyl hexyl ketone and methyl isopropenyl ketone; vinylidene halides, such as vinylidene chloride and vinylidene chlorofluoride; N-vinyl indole; N-vinyl pyrrolidone; methacrylate; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; and isobutylene. Combinations of different types of these monomers may be used. In embodiments, the monomers used to form the resin particles comprise a styrene, an alkyl (meth)acrylate (e.g., methyl (meth)acrylate, ethyl (meth)acrylate), butyl (meth)acrylate), or combinations thereof. Thus, the alkyl group of the alkyl (meth)acrylates may have 1 or more carbons, 2 or more carbons, 4 or more carbons, or from 1 to 6 carbons.

Acidic monomers may be used to form the resin particles such as (meth)acrylic acid monomers, sulfonic acid monomers, sulfonate monomers, and combinations thereof. Illustrative acidic monomers include acrylic acid, methacrylic acid, ethacrylic acid, dimethylacrylic acid, maleic anhydride, maleic acid, styrenesulfonic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryoyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof. These acidic monomers also encompass salts thereof, e.g., salt of a sulfonic acid.

In embodiments, two different acidic monomers are used to form the resin particles, each having a different $pK_a$ value. The $pK_a$ values of the two different acidic monomers may differ from one another by at least 2 units, at least 3 units, at least 4 units, or at least 5 units. In embodiments, the two different acidic monomers are present in a monomer emulsion used to form the resin particles at a weight ratio of acidic monomer having a higher $pK_a$ to acidic monomer having a lower $pK_a$ in a range of from 0.1 to 10. This includes a range of from 0.5 to 8 and from 1 to 6. In embodiments, two different types of acidic monomers are used to form the resin particles, comprising a methacrylic acid and a sulfonic acid.

Multifunctional monomers may be used to form the resin particles, i.e., those comprising more than one polymerizable group (e.g., 2, 3, 4). These are useful as they facilitate crosslinking within the resin particles. Illustrative multifunctional monomers include difunctional monomers such as a poly(ethylene glycol) di(meth)acrylate, e.g., poly(ethylene glycol) diacrylate having a molecular weight of 250 g/mol. Other poly(ethylene glycol) di(meth)acrylates may be used, including those having a molecular weight in a range of from 214 g/mol to 1000 g/mol, from 214 g/mol to 500 g/mol, and from 214 g/mol to 300 g/mol. These molecular weight values may be determined using gel permeation chromatography. Other difunctional monomers include a diacrylate compound bonded with an alkyl chain containing an ether bond, such as diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and compounds obtained by substituting acrylate of these compounds with methacrylate; a diacrylate compound bonded with a chain containing an aromatic group and an ether bond, such as polyoxyethylene (2)-2,2-bis(4-hydroxyphenyl)propane diacrylate, polyoxyethylene(4)-2,2-bis(4-hydroxyphenyl)propane diacrylate, and compounds obtained by substituting acrylate of these compounds with methacrylate. Other difunctional monomers include a diene compound, such as isoprene and butadiene, an aromatic divinyl compound, such as divinylbenzene and divinylnaphthalene; a diacrylate compound bonded with an alkyl chain, such as ethylene glycol diacrylate, 1,3-butylene glycol diacrylate, 1,4-butanediol diacrylate, 1,5-pentanediol diacrylate, 1,6-hexanediol diacrylate, 1,10-dodecanediol diacrylate, neopentyl glycol diacrylate, and compounds obtained by substituting acrylate of these compounds with methacrylate. Multifunctional monomers include pentaerythritol triacrylate, trimethylolmethane triacrylate, trimethylolpropane triacrylate, tetramethylolmethane tetraacrylate, oligoester acrylate, and compounds obtained by substituting acrylate of these compounds with methacrylate.

Reactive surfactants may be used to form the resin particles. Suitable reactive surfactants comprise a polymerizable (and thus, reactive) group such that they become incorporated into the resin particles. Illustrative reactive surfactants include anionic ether sulfate reactive surfactants such as those in the commercially available Hitenol series such as Hitenol AR10-25. Other suitable reactive surfactants include polyoxyethylene alkylphenyl ether ammonium sulfate, Hitenol BC-10, BC-20, BC10-25, BC-2020, BC-30; polyoxyethylene styrenated phenyl ether ammonium sulfate including Hitenol AR-10, AR-20, AR-2020; non-ionic polyoxyethylene alkylphenyl ether including Noigen RN-10, RN-20, RN-30, RN-40, RN-5065; and reactive surfactant available from Ethox including E-sperse RX-201, RX-202, RX-203, RS-1596, RS-1616, RS-1617, RS-1618, RS-1684.

A chain transfer agent may be used to form the resin particles. The chain transfer agent may be a mercaptan or a thiol. Suitable chain transfer agents include n-dodecylmercaptan (NDM), n-dodecanethiol (DDT), tert-dodecylmercaptan, 1-butanethiol, 2-butanethiol, octanethiol, and combinations thereof. Halogenated carbons such as carbon tetrabromide, carbon tetrachloride, and combinations thereof may be used as chain transfer agents.

In embodiments, certain monomers may be excluded in forming the resin particles. Excluded monomers may include one or more of the following: vinyl-imidazolium monomers, urethane (meth)acrylate monomers, and silyl ester monomers such as (meth)acrylic acid triisoproylsilyl ester.

In forming the latex comprising the resin particles, various combinations of the monomers described above may be used in a monomer emulsion comprising a solvent. Water is generally used as the solvent, but water-soluble or water-miscible organic solvents (e.g., ethanol) may also be included. The type of monomers and their relative amounts may be selected to tune the properties of the resin particles/latex, including to achieve the values of the properties described below. Illustrative amounts are provided below.

The dioxane/dioxolane monomer may be used in the monomer emulsion in an amount in a range of from 1 weight % to 40 weight %, 1 weight % to 30 weight %, 1 weight % to 20 weight %, from 2 weight % to 18 weight %, and from 5 weight % to 15 weight %. (Here, weight % refers to the (total weight of dioxane/dioxolane monomers)/(total weight of monomers in the monomer emulsion, excluding the reactive surfactants)*100). Acidic monomers may be used in the monomer emulsion in an amount in a range of from 2 weight % to 20 weight % and from 5 weight % to 15 weight %. (Weight % has a meaning analogous to that described for dioxane/dioxolane monomers.) As noted above, two different types of acidic monomers having different pKa values may be used in the weight ratios described above. Multifunctional monomers, including difunctional monomers, may be used in the monomer emulsion in a range of from 0.001 weight % to 1 weight %, from 0.001 weight % to 0.8 weight %, and from 0.01 weight % to 0.6 weight %. (Weight % has a meaning analogous to that described for dioxane/dioxolane monomers.) Other monomers, (e.g., styrenes, alkyl (meth)acrylates) may be present in an amount in a range of from 70 weight % to 97 weight % and from 75 weight % to 90 weight %. (Weight % has a meaning analogous to that described for dioxane/dioxolane monomers.) When present, the alkyl (meth)acrylate (e.g., methyl (meth)acrylate, ethyl (meth)acrylate, butyl (meth)acrylate) may be present at an amount of at least 15 weight %, at least 20 weight %, or in a range of from 15 weight % to 30 weight %.

Reactive surfactants may be used in the monomer emulsion an amount in a range of from 1.5 weight % to 6.5 weight %. (Here, weight % refers to the (total weight of reactive surfactants)/(total weight of monomers in the monomer emulsion, including the reactive surfactant monomers) *100). This range includes from 1.5 weight % to 5 weight %.

The chain transfer agent(s) may be present in the monomer emulsion and may be used in various suitable amounts, for example, from 0.25 weight % to 2.5 weight %. (Here, weight % refers to the (total weight of chain transfer agents)/(total weight of monomers in the monomer emulsion, excluding the reactive surfactants)*100.)

In embodiments, the monomer emulsion comprises (or consists of) a solvent, a dioxane/dioxolane monomer, and an additional monomer. In embodiments, the additional monomer is an acidic monomer (e.g., methacrylic acid, a sulfonic acid, or both). In embodiments, at least two additional monomers are included, a relatively high $T_g$ monomer (e.g., styrene or methyl methacrylate) and a relatively low $T_g$ monomer (e.g., alkyl acrylate such as butyl acrylate). In embodiments, a multifunctional monomer is included. In embodiments, the monomer emulsion comprises (or consists of) a solvent, a dioxane/dioxolane monomer, styrene, an alkyl acrylate (e.g., butyl acrylate), an acidic monomer (methacrylic acid, a sulfonic acid, or both), a multifunctional monomer (e.g., a difunctional monomer such as a poly (ethylene glycol) diacrylate), and a reactive surfactant (e.g., an anionic ether sulfate). In any of these embodiments, a chain transfer agent may be used. In any of these embodiments, amounts of the various monomers, reactive surfactants, and chain transfer agents may be used as described above. The balance may be made up of the solvent.

In embodiments, the monomer emulsion is free of (i.e., does not comprise) a surfactant. However, in other embodiments, a surfactant may be used. Here, "surfactant" refers to non-reactive, non-polymerizable anionic surfactants such as sodium dodecylsulfate (SDS), sodium dodecylbenzene sulfonate, sodium dodecylnaphthalene sulfate; dialkyl benzenealkyl sulfates; palmitic acid; alkyldiphenyloxide disulfonate; and branched sodium dodecyl benzene sulfonate. "Surfactant" also refers to non-reactive, non-polymerizable cationic surfactants such as alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromide, halide salts of quarternized polyoxyethylalkylamines, and dodecylbenzyl triethyl ammonium chlorides. "Surfactant" also refers to non-reactive, non-polymerizable nonionic surfactants such as polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, and block copolymer of polyethylene oxide and polypropylene oxide.

In embodiments, the monomer emulsion is free of (i.e., does not comprise) silica particles. Although silica particles have been used to increase viscosities, embodiments of the present resin particles are able to render latexes with high viscosities even without such silica particles. Commercially available silica particles which may be excluded are the following: various grades of LUDOX Colloidal Silica such as FM, SM, HS-30, HS-40, LS, TM-40, TM-50, SM-AS, AS-30, AS-40, AM, HSA, TMA, P X-30, P t-40, P W-50, CL, and CL-P; and various grades of Nissan Chemical Silica such as SNOWTEX ST-20L, ST-30, ST-40, ST-50, ST-OS, ST-O, ST-O-40, ST-OL, ST-C, ST-C-30, ST-CM, ST-N, STN30G, ST-N40, ST-NS, ST-XS, ST-S, ST-UP, ST-O-UP, MA-ST-UP, ST-PS-S, AMT-3305, HX-305M1, and HX-305M5.

Various polymerization techniques may be used to form the resin particles such as monomer-starved emulsion polymerization, conventional emulsion polymerization, suspension polymerization, mini-emulsion polymerization, nano-emulsion polymerization, seeded-emulsion polymerization, and microemulsion polymerization. These polymerization techniques may make use of any of the monomer emulsions described above. An illustrative monomer-starved emulsion polymerization process is described below. However, as noted above, other processes may be used. (See also, Example 4 describing an illustrative seeded-emulsion polymerization process.)

An illustrative method of making a latex comprising the resin particles comprises adding any of the monomer emulsions described above to a reactive surfactant solution at a feed rate over a period of time. The reactive surfactant solution comprises a solvent and a reactive surfactant. Any of the solvents and any of the reactive surfactants described above may be used. The reactive surfactant in the reactive surfactant solution may be the same type or a different type as compared to a reactive surfactant that may be present in the monomer emulsion. The reactive surfactant solution may further comprise a buffer. Various buffers may be used such as sodium bicarbonate, sodium carbonate, and ammonium hydroxide. The reactive surfactant may be used in an amount in a range of from 1 weight % to 10 weight % and from 2 weight % to 5 weight %. (Here, weight % refers to the (total weight of reactive surfactants)/(total weight of reactive surfactant solution)*100.) The buffer may be used in an amount in a range of from 0.25 weight % to 2.5 weight %. (Weight % has a meaning analogous to that described above.)

An initiator may be included in the reactive surfactant solution. Alternatively, a separate initiator solution comprising the initiator and any of the solvents described above may be formed and the separate initiator solution added to the reactive surfactant solution. The separate initiator solution may be added prior to the addition of the monomer emulsion. An additional amount of a separate initiator solution may be added after the addition of the monomer emulsion. Examples of suitable initiators include water soluble initiators, such as ammonium persulfate (APS), sodium persulfate and potassium persulfate; and organic soluble initiators including organic peroxides and azo compounds including Vazo peroxides, such as VAZO 64™, 2-methyl 2-2'-azobis propanenitrile, VAZO 88™, 2-2'-azobis isobutyramide dehydrate; and combinations thereof. Other water-soluble initiators which may be used include azoamidine compounds, for example 2,2'-azobis(2-methyl-N-phenylpropionamidine) dihydrochloride, 2,2'-azobis[N-(4-chlorophenyl)-2-methylpropionamidine]di-hydrochloride, 2,2'-azobis[N-(4-hydroxyphenyl)-2-methyl-propionamidine] dihydrochloride, 2,2'-azobis[N-(4-amino-phenyl)-2-methylpropionamidine]tetrahydrochloride, 2,2'-azobis[2-methyl-N-(phenylmethyl)propionamidine]dihydrochloride, 2,2'-azobis[2-methyl-N-2-ropenylpropionamidine]dihydrochloride, 2,2'-azobis[N-(2-hydroxy-ethyl)2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane] dihydrochloride, 2,2'-azobis[2-(3,4,5,6-tetrahydropyrimidin-2-yl)propane]dihydrochlo-ride, 2,2'-azobis[2-(5-hydroxy-3,4,5,6-tetrahydropyrimidin-2-yl) propane]di-hydrochloride, 2,2'-azobis {2[1-(2-hydroxyethyl)-2-imidazolin-2-yl]propane} dihydrochloride, and combinations thereof. The initiator may be used in an amount in a range of from 0.05 weight % to 2.5 weight %. (Here, weight % refers to the (total weight of initiators)/(total weight of reactive surfactant solution)*100.)

In embodiments, the reactive surfactant solution comprises (or consists of) a solvent (e.g., water), a reactive surfactant, and optionally, one or more of an initiator and a buffer. In any of these embodiments, amounts of the reactive surfactants, initiator, and buffer may be used as described above. The balance may be made up of the solvent. At least in some embodiments, the reactive surfactant solution is free of (i.e., does not comprise) any of the surfactants described above. In at least some embodiments, the reactive surfactant solution is free of (i.e., does not comprise) any of the silica particles described above. As a result, the resin particles may be characterized as being free of (i.e., not comprising) any of the surfactants and/or any of the silica particles described above. In at least some embodiments, the reactive surfactant solution is free of (i.e., does not comprise) any monomers, other than the reactive surfactant monomer(s) present in the solution.

The addition of the monomer emulsion to the reactive surfactant solution may be carried out under an inert gas (e.g., nitrogen) and at an elevated temperature (e.g., greater than room temperature such as a temperature in a range of from 50° C. to 90° C.). This may be accomplished by purging with the inert gas and heating the reactive surfactant solution prior to the addition of the monomer emulsion and continuing during the addition of the monomer emulsion.

As noted above, the monomer emulsion is added at a feed rate over a period of time. In the presence of the initiator, the monomers of the monomer emulsion undergo polymerization reactions to form the resin particles of the high viscosity latex. The feed rate is sufficiently slow so that the polymerization is carried out under "monomer-starved" conditions. This means that the feed rate is no greater than the rate the polymerization reactions, e.g., between styrene and acrylate monomers. Illustrative feed rates include those in a range of from 1 mL/min to 10 mL/min based on a total reaction volume of 1 L. Illustrative periods of time include those in a range of from 60 minutes to 600 minutes. After the monomer emulsion has been added, the polymerization may be allowed to continue for an additional period of time, with or without the addition of additional initiator. Illustrative additional periods of time include those in a range of from 1 hour to 18 hours. Both the addition of the monomer emulsion and the polymerization after addition may be carried out under the inert gas and at the elevated temperature. Optionally, the latex formed may be processed by standard techniques such as coagulation, dissolution and precipitation, filtering, washing, or drying. The processed or unprocessed latex may be used to form the ink compositions described below.

The monomer-starved emulsion polymerization process described above does not involve the use of a resin seed in forming the resin particles. However, as noted above, seeded-emulsion polymerization techniques may be used (see Example 4.)

The methods may further comprise forming the monomer emulsion, forming the reactive surfactant solution, and/or forming the initiator solution. Each may be formed by combining the desired components at the desired amounts and mixing.

The composition of the resin particles depends upon the selection of the monomers and their relative amounts, as well as the polymerization reactions between selected monomers that produce a polymerization product as described above. Thus, a variety of compositions are encompassed, including those based on various polymerization products of reactants comprising various combinations of monomers. As noted above, the reactants include a dioxane/dioxolane monomer, but otherwise, the selection of other monomers is not particularly limited. For clarity, the composition of the resin particles may be identified by reference to the monomers which are polymerized, recognizing that the chemical form of those monomers is generally altered as a result of the polymerization reactions. In embodiments, the resin particles comprise (or consist of) the polymerization product (e.g., copolymer) of reactants comprising a dioxane/dioxolane monomer and an additional monomer. In embodiments, the resin particles comprise (or consist of) the polymerization product (e.g., copolymer) of reactants comprising a dioxane/dioxolane monomer, an additional monomer, and a multifunctional monomer. In embodiments, the resin particles comprise (or consist of) the polymerization product (e.g., copolymer) of reactants comprising a dioxane/dioxolane monomer, styrene, an alkyl acrylate (e.g., butyl acrylate), an acidic monomer (a methacrylic acid, a sulfonic acid, or both), a multifunctional monomer (e.g., a difunctional monomer such as a poly(ethylene glycol) diacrylate), and a reactive surfactant (e.g., an anionic ether sulfate). In each of these embodiments, an initiator (or a portion thereof) may be incorporated at the beginning and end of each polymer chain in the resin particles. In each of these embodiments, the resin may be crosslinked due to the multifunctional/difunctional monomer. In each of these embodiments, the monomers may be present in the resin particles in the amounts described above. (Experiments have shown that the conversion of the monomers is above 99.9%.) For example, the amount of the dioxane/dioxolane monomers may be in a range of from 1 weight % to 40 weight % in the resin particles. As above, this weight % refers to the (total weight of dioxane/dioxolane monomers)/(total weight of monomers in the resin particles, excluding the reactive surfactants)*100.

Using a specific, illustrative composition, the composition of the resin particles may also be identified as crosslinked poly[(styrene)-ran-(butyl acrylate)-ran-(methacrylic acid)-ran-(glycerol formal (meth)acrylate)-ran-(styrenesulfonic acid)-ran-(anionic ether sulfate)]. In this description, the different chemical moieties which result from the polymerization reactions is identified by reference to the corresponding monomer in its parenthesis and "ran" refers to the random incorporation of the different monomers into the copolymer. The use of this description encompasses the presence of an initiator (or portion thereof) at the beginning of each copolymer as well as crosslinking via the multifunctional/difunctional monomer.

In embodiments in which certain monomers are excluded from forming the resin particles, it follows that such monomers do not participate in the polymerization reactions to form the polymeric matrix of the resin particles. Thus, in these embodiments, the composition of the resin particles may be described as being free of (i.e., not comprising) one or more of vinyl-imidazolium monomers, urethane (meth)acrylate monomers, and silyl ester monomers such as (meth)acrylic acid triisoproylsilyl ester.

In embodiments, the latex may be described as being free of (i.e., not comprising) a resin/polymer other than what is provided by the resin of the present resin particles themselves. This includes being free of a polyurethane, a polyurethane (meth)acrylate, a poly(meth)acrylate (other than the resin particles themselves), a polyester, a silyl ester copolymer, a silyl (meth)acrylate polymer, or combinations thereof Since the resin/polymer making up the resin particles has already been polymerized, the latex itself is generally not curable and as such, is free of (i.e., does not comprise) an initiator. This does not preclude the presence of a minor amount of unreacted initiator or reacted initiator which may be incorporated into polymer chains. Similarly, the latex may be described as being free of (i.e., not comprising monomers).

In embodiments, the latex may also be described as being free of (i.e., not comprising) a fungicide/biocide such as medetomidine.

The water content of the latexes may be at least 40 weight %. This includes at least 50 weight % and at least 60 weight %. These weight % refer to the weight of water as compared to the total weight of the latex.

In embodiments, the resin particles have a core/shell morphology. Core/shell resin particles may be formed using seeded-emulsion polymerization (see Example 4) in which one monomer emulsion (seed monomer emulsion) is used to form the core and a different monomer emulsion (feed monomer emulsion) is used to form the "shell." However, seeded-emulsion polymerization may be used to form resin particles in which the seed monomer emulsion and the feed monomer emulsion have the same composition.

The resin particles may be characterized by their size. The size of the particles may be reported as a $D_{50}$ particle size, which refers to a diameter at which 50% of the sample (on a volume basis) is comprised of particles having a diameter less than said diameter value. The $D_{50}$ particle size may be measured using a Malvern Zetasizer Nano ZS. For check of light scattering techniques and methods, NIST polystyrene Nanosphere control samples having a diameter within the range of 20 nm to 200 nm available from Microspheres-Nanospheres (a Corpuscular company of Microtrac) or third-party vendors (such as ThermoFisher Scientific) may be used. Since at least embodiments of the resin particles have a size that is dependent upon pH, the sizes may be reported with respect to a particular pH. In embodiments, the resin particles are characterized by a $D_{50}$ particle size at a pH of 8 that is larger than the $D_{50}$ particle size at pH 3. This includes at least 15% larger, at least 18% larger, at least 20% larger, at least 22% larger, at least 25% larger, or larger by from 15% to 30%. In embodiments, the $D_{50}$ particle size at pH 3 is no greater than 100 nm, no greater than 90 nm, no greater than 80 nm, no greater than 70 nm, or in a range of from 60 nm to 90 nm.

Latexes comprising the present resin particles may be characterized by their viscosities. The viscosity values may refer to a particular temperature and a particular solids content and may be measured using a Tuning fork vibration viscometer (Cole-Parmer) as described in the Examples, below. Again, since at least embodiments of the resin particles render latexes with a viscosity that is dependent upon pH, the viscosities may be reported with respect to a particular pH. In embodiments, the latex comprising the resin particles is characterized by viscosity at room temperature, a solids content of 30%, and a pH of 8 that is greater than the viscosity at room temperature, a solids content of 30%, and a pH of 3. This includes 2 times greater, 3 times greater, 4 times greater, 5 times greater, or greater by from 2 to 10 times. In embodiments, the viscosity at room temperature, a solids content of 30%, and a pH of 3 is in a range of from 10 cP to 100 cP. This includes from 10 cP to 80 cP, from 10 cP to 40 cP, and from 15 cP to 40 cP. These viscosities are all initial viscosities, measured within a day of forming the latex.

The present resin particles may also be characterized by their $T_g$ values. The $T_g$ values may be measured using a Differential Scanning calorimetry (DSC) TA Instruments Discovery DSC 2500 as described in the Examples, below.

In embodiments, the $T_g$ is in a range of from 50° C. to 100° C. This includes a range of from 50° C. to 90° C., and from 50° C. to 80° C.

Ink Compositions

Any of the resin particles/latexes described above may be used to provide an ink composition. The type of ink composition is not particularly limited. However, ink compositions comprising a significant amount of water, e.g., at least 50 weight %, are particularly useful. Illustrative ink compositions include aqueous inkjet ink compositions and pen ink compositions. Illustrative aqueous inkjet ink compositions are described below. However, it is understood that the present disclosure extends to other types of ink compositions.

Resin particles may be present in the aqueous inkjet ink composition in an amount in a range of from 1 weight % to 10 weight % and from 5 weight % to 10 weight %. (Here, weight % refers to the (total weight of resin particles)/(total weight of aqueous inkjet ink composition)*100.) This range includes from 5 weight % to 10 weight %. A variety of other components may be used to form the aqueous inkjet ink compositions as described below.

Solvent System

The aqueous inkjet ink compositions comprise a solvent system based on water. The solvent system can consist solely of water, or can comprise a mixture of water and a water-soluble and/or water-miscible organic solvent. The water-soluble and water-miscible organic solvents may be referred to herein as a co-solvent or a humectant. Suitable such organic solvents include alcohols and alcohol derivatives, including aliphatic alcohols, aromatic alcohols, diols, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, and ethoxylated glycerol. Illustrative examples include ethylene glycol, propylene glycol, diethylene glycols, glycerine, dipropylene glycols, trimethylolpropane, 1,2-hexanediol, 1,5-pentanediol, 2-methyl-1,3-propanediol, 2-ethyl-2-hydroxymethyl-1,3-propanediol, 3-methoxybutanol, 3-methyl-1,5-pentanediol, 1,3-propanediol, 1,4-butanediol, and 2,4-heptanediol. Other suitable solvents include amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, and substituted and unsubstituted acetamides. Combinations of these organic solvents may be used.

Suitable water-soluble and/or water-miscible organic solvents include a glycol of hydrocarbons having a carbon number of 4 to 7. Examples of such a glycol include 1,2-pentane diol; 1,2-hexanediol; 1,5-pentanediol; 1,6-hexanediol; 3-methyl-1,3-butanediol; 1,2-butanediol; 2,4-pentanediol; 1,7-heptanediol; 3-methyl-1,5-pentanediol; trimethylolpropane; ethyleneurea; 1,2,6-hexantriol; 1,2,3-butanetriol; sorbitol; diethylene glycol; 1,2,4-butanetriol; glycerol; diglycerol; and triethylene glycol;.

In embodiments, the solvent system comprises water, a 1,2-alcohol (e.g., 1,2-hexanediol), a glycol (e.g., propylene glycol), and a glycerol.

In solvent systems comprising water and an organic solvent, the water to organic solvent weight ratio, as well as the type and relative amount of different organic solvents, may be selected to achieve certain properties for the aqueous inkjet ink composition such as a desired surface tension, viscosity, etc. In embodiments, the water to organic solvent weight ratio is from 90:10 to 51:49. If more than one organic solvent is used, these weight ratios refer to the total amount of organic solvent. As water may be present in the latex, colorant, etc., these weight ratios refer to the total amount of water.

Similarly, various total amounts of the solvent system may be used in the aqueous inkjet ink compositions. In embodiments, the solvent system is present in an amount of from 50 weight % to 95 weight %, from 60 weight % to 90 weight %, or from 65 weight % to 90 weight %. (Here, weight % refers to the (total weight of solvent system)/(total weight of aqueous inkjet ink composition)*100.) In embodiments, the total amount of water present is at least 50 weight %, at least 60 weight %, at least 80 weight %, or in a range of from 50 weight % to 95 weight %. (Here, weight % refers to the (total weight of water)/(total weight of aqueous inkjet ink composition)*100.)

Colorant

The aqueous inkjet ink composition may comprise a colorant. Colorants include pigments, dyes, and combinations thereof. Examples of suitable dyes include anionic dyes, cationic dyes, nonionic dyes, and zwitterionic dyes. Specific examples of suitable dyes include Food dyes such as Food Black No. 1, Food Black No. 2, Food Red No. 40, Food Blue No. 1, Food Yellow No. 7, FD & C dyes, Acid Black dyes (No. 1, 7, 9, 24, 26, 48, 52, 58, 60, 61, 63, 92, 107, 109, 118, 119, 131, 140, 155, 156, 172, 194), Acid Red dyes (No. 1, 8, 32, 35, 37, 52, 57, 92, 115, 119, 154, 249, 254, 256), Acid Blue dyes (No. 1, 7, 9, 25, 40, 45, 62, 78, 80, 92, 102, 104, 113, 117, 127, 158, 175, 183, 193, 209), Acid Yellow dyes (No. 3, 7, 17, 19, 23, 25, 29, 38, 42, 49, 59, 61, 72, 73, 114, 128, 151), Direct Black dyes (No. 4, 14, 17, 22, 27, 38, 51, 112, 117, 154, 168), Direct Blue dyes (No. 1, 6, 8, 14, 15, 25, 71, 76, 78, 80, 86, 90, 106, 108, 123, 163, 165, 199, 226), Direct Red dyes (No. 1, 2, 16, 23, 24, 28, 39, 62, 72, 236), Direct Yellow dyes (No. 4, 11, 12, 27, 28, 33, 34, 39, 50, 58, 86, 100, 106, 107, 118, 127, 132, 142, 157), Reactive Dyes, such as Reactive Red Dyes (No. 4, 31, 56, 180), Reactive Black dyes (No. 31), Reactive Yellow dyes (No. 37); anthraquinone dyes, monoazo dyes, disazo dyes, phthalocyanine derivatives, including various phthalocyanine sulfonate salts, aza(18)annulenes, formazan copper complexes, and triphenodioxazines.

Examples of suitable pigments include black pigments, cyan pigments, magenta pigments, and yellow pigments. Pigments can be organic or inorganic particles. Suitable inorganic pigments include carbon black. However, other inorganic pigments may be suitable such ascobalt blue ($CoO$—$Al_2O_3$), chrome yellow ($PbCrO_4$), iron oxide, and titanium dioxide ($TiO_2$). Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, and anthanthrone pigments such as PR168. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH® 1400, MONARCH® 1300, MONARCH® 1100, MONARCH® 1000, MONARCH® 900, MONARCH® 880, MONARCH® 800, MONARCH® 700, CAB-O-JET® 200, CAB-O-JET® 300, CAB-O-JET® 450, REGAL®, BLACK PEARLS®, ELFTEX®, MOGUL®, and VULCAN® pigments; Columbian pigments such as RAVEN® 5000, and RAVEN® 3500; Evonik pigments such as Color Black FW 200, FW 2, FW 2V, FW 1, FW18, FW 5160, FW 5170, Special Black 6, Special Black 5, Special Black 4A, Special Black 4, PRINTEX® U, PRINTEX® 140U, PRINTEX® V, and PRINTEX® 140V. Other pigments include CAB-O-JET 352K, CAB-O-JET 250C, CAB-O-JET 260M, CAB-O-JET 270Y, CAB-O-JET 465M, CAB-O-JET 470Y and CAB-O-JET 480V (available from Cabot Corporation).

The above list of pigments includes unmodified pigment particulates, small molecule attached pigment particulates, self-dispersed pigment particulates, and polymer-dispersed pigment particulates.

In forming the aqueous inkjet ink compositions, the colorant(s) may be provided as a colorant dispersion comprising the colorant and a solvent (e.g., water). The colorant may be in the form of a particle and have an average particle size of from 20 nm to 500 nm, from 20 nm to 400 nm, or from 30 nm to 300 nm.

Various amounts of colorant may be used in the aqueous inkjet ink compositions. Generally, however, an amount is selected such that the total solids content (generally provided by the resin particles, the colorant, and if present, a wax) of the aqueous inkjet ink composition is from 5 weight % to 15 weight %, from 6 weight % to 12 weight %, or from 7 weight % to 10 weight %. (Here, weight % refers to the (total weight of solids)/(total weight of aqueous inkjet ink composition)*100.)

Wax

The aqueous inkjet ink composition may comprise a wax. Illustrative waxes include paraffin waxes, polyethylene waxes, polypropylene waxes, microcrystalline waxes, polyolefin waxes, montan based ester waxes and carnauba waxes. Waxes having a melting point in a range of from 50° C. to 150° C. may be used. Nanoscale (e.g., diameter of 1000 nm or less, 500 nm or less, or 100 nm or less) wax emulsions based on carnauba wax and paraffin wax may be used. Waxes from Michelman may be used (e.g., Michem Lube 103DI, 124, 124P135,156, 180, 182, 190, 270R, 368, 511, 693, 723, 743, 743P, and 985; and Michem Emulsion 24414, 34935, 36840, 41740, 43040, 43240, 44730, 47950, 48040M2, 61355, 62330, 66035, 67235, 70750, 71150, 71152, 91735, 93235, 93335, 93935, and 94340). Waxes from Byk may also be used, including Aquacer 2500, Aquacer 507, Aquacer 513, Aquacer 530, Aquacer 531, Aquacer532, Aquacer 535, Aquacer 537, Aquacer 539, and Aquacer 593. In embodiments, the wax is an anionic nanoscale wax emulsion such as Michem Lube 190.

Various amounts of wax may be used in the aqueous inkjet ink compositions. Generally, however, an amount is selected such that the total solids content of the aqueous inkjet ink composition is from 5 weight % to 15 weight %, from 6 weight % to 12 weight %, or from 7 weight % to 10 weight %. (Here, weight % refers to the (total weight of solids)/ (total weight of aqueous inkjet ink composition)*100.)

Surfactant

The aqueous inkjet ink compositions may comprise one or more surfactants. Examples of suitable surfactants include anionic surfactants (such as sodium lauryl sulfate (SLS), Dextrol OC-40, Strodex PK 90, ammonium lauryl sulfate, potassium lauryl sulfate, sodium myreth sulfate and sodium dioctyl sulfosuccinate series), nonionic surfactants (Surfynol® 104 series, Surfynol® 400 series, Dynol™ 604, Dynol™ 607, Dynol™ 810, EnviroGem® 360, secondary alcohol ethoxylate series such as Tergitol™ 15-S-7, Tergitol™ 15-S-9, TMN-6, TMN-100× and Tergitol™ NP-9, Triton™ X-100, etc.) and cationic surfactants (Chemguard S-106A, Chemguard S-208M, Chemguard S-216M). Some fluorinated or silicone surfactants can be used such as PolyFox™ TMPF-136A, 156A, 151N, Chemguard S-761p, S-764p, Silsurf® A008, Siltec® C-408, BYK 345, 346, 347, 348 and 349, polyether siloxane copolymer TEGO® Wet- 260, 270 500, etc. Some amphoteric fluorinated surfactants can also be used such as alkyl betaine fluorosurfactant or alkyl amine oxide fluorosurfactant such as Chemguard S-500 and Chemguard 5-111. Other surfactants which may be used include Surfynol PSA 336, Surfynol SE-F, and Surfynol 107L.

Various amounts of surfactant may be used in the aqueous inkjet ink compositions. In embodiments, the surfactant is present in an amount in a range of from 0.01 weight % to 2 weight %. (Here, weight % refers to the (total weight of surfactant)/(total weight of aqueous inkjet ink composition) *100.) If more than one type of surfactant is used, these amounts refer to the total amount of surfactant.

Additives

Various additives may be used in the aqueous inkjet ink compositions to tune the properties thereof. Suitable additives include one or more of biocides; fungicides; stabilizers; pH controlling agents such as acids or bases, phosphate salts, carboxylates salts, sulfite salts, amine salts, buffer solutions; sequestering agents such as EDTA (ethylenediamine tetra acetic acid); anti-foam agents; defoamers; and wetting agents.

Various amounts of the additives may be used in the aqueous inkjet ink compositions. In embodiments, the additives are present in an amount in a range of from 0.01 weight % to 5 weight %. (Here, weight % refers to the (total weight of additives)/(total weight of aqueous inkjet ink composition)*100.) If more than one type of additive is used, these amounts refer to the total amount of additives.

In at least embodiments, the aqueous inkjet ink compositions are free of (i.e., do not comprise) a coagulant and are free of (i.e., do not comprise) a coalescing agent and are free of (i.e., do not comprise) a plasticizer. In embodiments, the aqueous inkjet ink compositions are free of (i.e., do not comprise) any pyrrolidone-based solvents such as N-methylpyrrolidone, and are free of (i.e., do not comprise) Texanol and Texanol isobutyrate. In embodiments, the aqueous inkjet ink compositions are free of (i.e., do not comprise) silica particles.

As noted above, aqueous inkjet ink compositions based on the present resin particles do not require the addition of an additive to further adjust viscosity. This can mean that the aqueous inkjet ink compositions may be free of (i.e., do not comprise) a water-soluble resin or emulsion, a water-borne binder, a polymeric dispersant, and combinations thereof. This includes the possible exclusion of any of the water-soluble resin or emulsions, water-borne binders, polymeric dispersants described below. However, it is understood that in some embodiments, such compounds may be included. Finally, it is noted that none of the terms water-soluble resin, water-soluble emulsion, water-borne binder, and polymeric dispersant encompass the present resin particles themselves. Illustrative water-soluble resins/emulsions are polyethylene glycol and polyvinylpyrrolidone.

Illustrative water-borne binders are Rhoplex 1-1955, Rhoplex I-2426D, Rhoplex I-62, Rhoplex 1-98, Rhoplex E-1691, available from Rhohm & Haas. Others include Lucidene 190, Lucidene 400, and Lucidene 243, available from DSM Corporation; NeoCryl A-1110, NeoCryl A-2092, NeoCryl A-639, NeoRad R-440, NeoRad R-441, NeoRez N-55 under the name 972, PVP K-15, PVP K-30, PVP K-60, PVP K-85, Ganex P-904LC, PVP/VA W-63 available from ISP. Other exemplary water-borne binders which may be excluded include those available from Johnson Polymers (BASF) such as Joncryl 537, Joncryl H538, Joncryl H538.

Illustrative polymeric dispersants are acrylic polymers such as styrene-acrylic copolymers and vinylpyrrolidone copolymers, urethane or polyurethane dispersions, and acrylic-urethane hybrid dispersions. More specific polymeric dispersants which may be excluded include those available from Johnson Polymers (BASF) such as Joncryl® 671, Joncryl® 683, Joncryl® 296, Joncryl® 690, Joncryl HPD 296, Joncryl HPD96-E, Joncryl LMV 7085, Joncryl 8082. Other dispersants which may be excluded include those described in EP Patent No. 2097265, which is incorporated by reference for purposes of the dispersants, and those described in U.S. Patent Application No. 2019284414, which is incorporated by reference for purposes of the dispersants.

Similarly, the aqueous inkjet ink compositions may be free of (i.e., do not comprise) a resin other than those provided by the resin of the present resin particles. This includes being free of a polyurethane, a poly(meth)acrylate (other than the resin particles themselves), a polyester or combinations thereof. A single type of resin may be used. Similarly, the aqueous inkjet ink composition itself is generally not curable and as such, is free of (i.e., does not comprise) an initiator. It is noted that any other exclusions referenced above with respect to the resin particles and latex may apply to embodiments of the aqueous inkjet ink compositions.

In embodiments, an ink composition (e.g., an aqueous inkjet ink composition) comprises (or consists of) a solvent system; resin particles; a colorant; and optionally, one or more of a wax and an additive. In embodiments, the ink composition comprises (or consists of) a solvent system; resin particles; a colorant; a wax; and optionally, an additive. In any of these embodiments, the additives may be selected from a stabilizer, a surfactant, an anti-foam agent, a defoamer, a wetting agent, and a biocide. In any of these embodiments, the components may be selected from any of the solvent systems, resin particles, colorants, waxes, and additives disclosed herein. In any of these embodiments, amounts of the components may be used as described above.

The ink compositions (e.g., aqueous inkjet ink compositions) may be formed by combining the desired components at the desired amounts and mixing. An illustrative method comprises adding any of the disclosed latexes (or the resin particles) to a colorant dispersion to form a first mixture; and adding a second mixture comprising a solvent system and an additive(s) to the first mixture to form the aqueous inkjet ink composition. A third mixture comprising a wax may be added to the combined first and second mixtures. Mixing and/or heating may be used during the method. The aqueous inkjet ink composition may be filtered prior to use. Illustrative details are provided in the Examples, below.

Properties

The aqueous inkjet ink compositions may be characterized by their gloss differential. Gloss differential may be measured as described in the Examples, below. In embodiments, the aqueous inkjet ink composition exhibits a gloss differential of less than 5 units, less than 4 units, or in a range of 1 to 5 units. As demonstrated in the Examples, below, these values are significantly smaller than gloss differentials obtained from a comparative aqueous inkjet ink composition comprising resin particles formed from a hydrophilic monomer (hydroxyethyl acrylate) in place of the dioxane/dioxolane monomer. This result is surprising in view of the relatively high $T_g$ values of the illustrative resin particles (80° C. and 67° C.) since high $T_g$ values are generally associated with high gloss differentials.

The aqueous inkjet ink compositions may be characterized by their water fastness. Wet rub resistance, measured as described in the Examples below, provides a measure of water fastness. In embodiments, the aqueous inkjet ink composition exhibits a wet rub resistance of at least 10, 15, or 20 as measured using an about 4.5 ng drop of the ink or a wet rub resistance of at least 20, 25, or 30 as measured using an about 9 ng drop of the ink. Again, this result is surprising in view of the relatively high $T_g$ values of the illustrative resin particles (80° C. and 67° C.) since high $T_g$ values are generally associated with poor wet rub resistance.

The aqueous inkjet ink compositions may be characterized by their open-air stability. The time before gelation in the aqueous inkjet ink composition upon exposure to air is observed provides a measure of such stability. This time may be determined as described in the Examples, below. In embodiments, the time before gelation is greater than 2 hours, greater than 3 hours, greater than 4 hours, or in a range of from 3 hours to 5 hours. As demonstrated in the Examples, the time before gelation was extended by about 100% for an illustrative aqueous inkjet ink composition as compared to a comparative aqueous inkjet ink composition comprising resin particles formed from a hydrophilic monomer (hydroxyethyl acrylate) in place of the dioxane/dioxolane monomer and a comparative aqueous inkjet ink composition comprising a water-soluble resin in place of the resin particles. This is surprising since the hydrophilic monomer and the water-soluble resin were expected to provide better stability in open-air as compared to resin particles based on the amphiphilic dioxane/dioxolane monomer.

The aqueous inkjet ink compositions may be used to form printed images. In embodiments, such a method comprises ejecting droplets of any of the disclosed aqueous inkjet ink compositions onto a substrate to form an image thereon. Such a method may further comprise incorporating the ink composition into an inkjet printing apparatus. The printing apparatus may employ a thermal inkjet process wherein the ink composition in the nozzles is selectively heated in an imagewise pattern, thereby causing droplets of the ink composition to be ejected in imagewise pattern. Alternatively, the printing apparatus may employ an acoustic inkjet process wherein droplets of the ink composition are caused to be ejected in imagewise pattern by acoustic beams. In yet another embodiment, the printing apparatus may employ a piezoelectric inkjet process, wherein droplets of the ink composition are caused to be ejected in imagewise pattern by oscillations of piezoelectric vibrating elements. Any suitable substrate can be employed.

The method may comprise ejecting ink droplets in an imagewise pattern onto an intermediate transfer member, heating the image to partially or completely remove solvents, and transferring the ink composition in the imagewise pattern from the intermediate transfer member to a final recording substrate. The intermediate transfer member may be heated to a temperature above that of the final recording sheet and below that of the ink composition in the printing apparatus. An offset or indirect printing process is also disclosed in, for example, U.S. Pat. No. 5,389,958, the disclosure of which is totally incorporated herein by reference.

Any suitable substrate or recording sheet can be employed as the final recording sheet.

Use of the present latexes/resin particles is not limited to providing ink compositions. By way of illustration, in view of the adhesive properties of the resin particles described above, the latex may be used to provide adhesives, which are generally in the form of a layer of the resin particles on a surface of a substrate. Such layers may be formed by applying any desired amount of any of the latexes described herein to a substrate, followed by removing water from the as-deposited latex to form the layer. A variety of thin-film deposition techniques may be use to apply the latex. Any desired substrate may used, e.g., paper, polymer, etc. A second substrate may be applied on the layer to form a bonded article, i.e., the two substrates adhered together via the adhesive in between. Any of the additives disclosed above with respect to the ink compositions may be included in the latex to achieve a desired property for the adhesive. Useful additives may include surfactants, wetting agents, viscosity adjusting additives. Any of these additives described above may be used in the amounts described above. Other additives which may be used include tackifiers such as rosin esters, rosin acids, and combinations thereof Any exclusions described above with respect to the latexes and ink compositions may also apply to embodiments of the adhesives. A latex comprising water, resin particles, and optionally, additives, and which is configured to provide an adhesive may be referred to as an aqueous adhesive composition.

EXAMPLES

The following Examples are being submitted to further define various species of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

Examples 1-3

A reactive surfactant solution of 1.1 grams (Hitenol AR 1025 from Montello) and 35 grams deionized water was prepared by mixing in a glass reactor. The reaction was then purged with nitrogen for 30 minutes. The reactor was then continuously purged with nitrogen while being stirred at 250 rpm. The reactor was then heated up to 75° C. and held there. Separately, 0.3 grams of ammonium persulfate (APS) initiator was dissolved in 5 grams of deionized water and added to the reactor.

Separately, a monomer emulsion was prepared in the following manner: styrene, butyl acrylate, methacrylic acid, sodium 4-styrenesulfonate (styrenesulfonic acid), dioxane/dioxolane monomer, 1-dodecanethiol (DDT), PEGDA 250, Hitenol AR 1025, and deionized water were mixed to form an emulsion. Different amounts of these components were used for each of Examples 1-3 as shown in Table 1. The emulsified mixture was fed to the reactor slowly for 2 h and the reaction continued for 2 h. An additional 0.15 g of APS initiator was dissolved in deionized water and added to the reactor over 10 minutes and the reaction continued for an additional 1.5 hours. The resulting latex was cooled to room temperature and neutralized to pH 8.0 with 2.5 M KOH solution.

The latex formulations are shown in Table 1 and the properties are shown in Table 2. A Malvern Nano-ZS was used to analyze the dimensions of the resin particles of the latex, including $D_{(z, ave)}$, $D_{(v, 50)}$ ($D_{50}$), and polydispersity index (PDI). $T_g$ was measured using a TA Instruments Discovery DSC 2500 at 3 continuous cycles of heating-cooling-heating with 10° C./min rate. The $T_g$ values are associated with the resin particles of the latexes.

Example 4

In Example 4, the monomer emulsion of Example 2 was used in a different polymerization process. Specifically, the latex was prepared using seeded-emulsion polymerization. Once the monomer emulsion of Example 2 was prepared, 25 wt % of the monomer emulsion was fed to the glass reactor at 0.5 mL/min. Then 0.3 grams of ammonium persulfate (APS) initiator was dissolved in 5 grams of deionized water and added to the reactor over 10 minutes. This step created the seeds for polymerization. This polymerization was allowed to react for 30 minutes. Afterwards, the remaining emulsion was fed to the reactor over 1.5 h and the reaction was allowed to continue for 2 h. Then an additional amount of 0.15 g of APS dissolved in DI water was added to the reactor over 10 minutes and the reaction was allowed to continue for an additional 1.5 h. The latex was then allowed to cool down to room temperature before neutralization to pH 8.0 with 2.5 M KOH solution. The latex formulation is shown in Table 1 and the properties are shown in Table 2.

Example 5 (Comparative)

In Example 5, the procedure of Example 1 was repeated but hydrophilic hydroxyethyl acrylate (HEA) was used in place of the amphiphilic dioxane/dioxolane monomer. Colloidal silica was also used. The latex formulation is shown in Table 1 and the properties are shown in Table 2.

Example 6 (Comparative)

In Example 6, the procedure of Example 1 was repeated but hydrophilic hydroxyethyl acrylate was used in place of amphiphilic the dioxane/dioxolane monomer. In addition, the ratio of styrene to butyl acrylate was modified. Colloidal silica was also used. The latex formulation is shown in Table 1 and the properties are shown in Table 2.

Example 7 (Comparative)

In Example 7, the procedure of Example 1 was repeated but no dioxane/dioxolane monomer was used and no hydroxyethyl acrylate was used. The latex formulation is shown in Table 1 and the properties of the latex are shown in Table 2.

TABLE 1

Latex Formulations.

| Material (g) | Example 1 | Example 2 | Example 3 | Example 4 | Example 5 | Example 6 | Example 7 |
|---|---|---|---|---|---|---|---|
| Styrene | 28 | 24 | 21 | 24 | 28 | 21 | 31 |
| Butyl Acrylate | 6 | 10 | 10 | 10 | 7 | 13 | 5 |
| Methacrylic Acid | 3 | 3 | 3 | 3 | 3 | 3 | 3 |
| Reactive Surfactant | 1.9 | 1.9 | 1.9 | 1.9 | 1.8 | 2 | 2.45 |
| Dioxane/dioxolane monomer | 2 | 2 | 5 | 2 | 0 | 0 | 0 |
| HEA | 0 | 0 | 0 | 0 | 1.25 | 1.2 | 0 |
| PEGDA 250 | 0.3 | 0.3 | 0.3 | 0.3 | 0.25 | 0.25 | 0.15 |
| DDT | 0.35 | 0.35 | 0.35 | 0.35 | 0.5 | 0.3 | 0.6 |
| 4-styrenesulfonate | 1 | 1 | 1 | 1 | 1 | 1 | 0.5 |
| Colloidal Silica | 0 | 0 | 0 | 0 | 0.75 | 0.8 | 0 |
| APS | 0.45 | 0.45 | 0.45 | 0.45 | 0.45 | 0.45 | 0.3 |
| Deionized water | 57 | 57 | 57 | 57 | 56 | 57 | 57 |
| Total | 100 | 100 | 100 | 100 | 100 | 100 | 100 |

TABLE 2

Latex/Resin Particle Properties.

| | $D_{z\text{-}ave}$ (nm) at pH 8 | PDI | $D_{50}$ (nm) at pH 3 | $D_{50}$ (nm) at pH 8 | % change in $D_{50}$ | $T_g$ (° C.) |
|---|---|---|---|---|---|---|
| Example 1 | 94 | 0.038 | 69 | 83 | 20 | 80 |
| Example 2 | 93 | 0.018 | 67 | 82 | 22 | 67 |
| Example 3 | 93 | 0.023 | 64 | 80 | 25 | 55 |
| Example 4 | 103 | 0.027 | 75 | 90 | 20 | 67 |
| Example 5 | 80 | 0.027 | 58 | 67 | 16 | 77 |
| Example 6 | 74 | 0.043 | 61 | 64 | 5 | 52 |
| Example 7 | 94 | 0.014 | 83 | 87 | 5 | 88 |

Examples 8-15

Aqueous inkjet ink compositions were formed using the latexes of Examples 1, 2, 3, and Comparative Example 5.

Another comparative aqueous inkjet ink composition was formed using a water-soluble resin and no resin particles. The following steps were used to form the aqueous inkjet ink compositions and the formulations are shown in Table 3:

1. The pigment dispersion was added to deionized water and mixed for about 15 minutes at a speed of about 300 RPM, using a Cowles blade impeller
2. The latex was added slowly to the pigment dispersion and mixed for about 20 minutes (Mixture A).
3. In a separate beaker, the co-solvents, humectant, stabilizer, defoamer, surfactant, and wetting agent were mixed to form a homogenous mixture (Mixture B).
4. Mixture B was slowly added into Mixture A. Once the addition was complete, the components were allowed to mix for another 20 minutes.
5. The wax was added and mixing continued for about another 15 minutes.
6. After mixing, the aqueous inkjet ink composition was left at room temperature for about 60 minutes before checking pH, conductivity and surface tension.

TABLE 3

Aqueous Inkjet Ink Compositions

| Component | Chemical | Example 8 | Example 9 | Example 10 | Example 11 | Example 12 | Example 13 | Example 14 | Example 15 |
|---|---|---|---|---|---|---|---|---|---|
| Solvent | Water | 21.85 | 15.1 | 19.27 | 14.27 | 15.93 | 18.855 | 14.065 | 7.27 |
| Colorant | CAB-O-JET ® 450C (15% solids) | 25.35 | 0 | 28 | 0 | 0 | 28 | 0 | 0 |
| Colorant | CAB-O-JET ® 325K (15% solids) | 0 | 35 | 0 | 35 | 35 | 0 | 35 | 35 |
| Latex | Latex of Example 1 (34.7%) | 12.1 | 10.2 | 0 | 0 | 0 | 0 | 0 | 0 |
| | Latex of Example 2 (34.7%) | 0 | 0 | 12.85 | 10.85 | 0 | 0 | 0 | 0 |
| | Latex of Example 3 (34.4%) | 0 | 0 | 0 | 0 | 8.5 | 0 | 0 | 0 |
| | Latex of Comparative Example 5 (32.15%) | 0 | 0 | 0 | 0 | 0 | 13.26 | 11.05 | 0 |
| Water-Soluble Resin | PEG 4000 (20% solids) | 0 | 0 | 0 | 0 | 0 | 0 | 0 | 18 |
| Defoamer | BKY024 | 0.1 | 0.1 | 0 | 0 | 0 | 0 | 0 | 0.1 |
| Co-solvent 1 | Propylene glycol | 29.5 | 28.5 | 29 | 29 | 29.4 | 29 | 29 | 28.5 |
| Co-solvent 2 | 1,2-hexanediol | 7 | 7 | 7.1 | 7.1 | 7.25 | 7.1 | 7.1 | 7 |
| Humectant | Glycerol | 2 | 2 | 2.5 | 2.5 | 2.5 | 2.5 | 2.5 | 2 |
| Stabilizer | Triethanolamine | 0.2 | 0.2 | 0.2 | 0.2 | 0.2 | 0.2 | 0.2 | 0.2 |
| Defoamer | BYK019 | 0.15 | 0.15 | 0 | 0 | 0 | 0 | 0 | 0.18 |
| Surfactant | Silicone (Byk 349) | 0.5 | 0.5 | 0 | 0 | 0 | 0 | 0 | 0.5 |
| Wetting Agent | Multifunctional nonionic surfactant Surfynol AD01 | 0.25 | 0.25 | 0 | 0 | 0 | 0 | 0 | 0.25 |
| Surfactant | Tego Twin 4000 | 0 | 0 | 0.03 | 0.03 | 0.02 | 0.035 | 0.035 | 0 |
| Defoamer | Surfonyl MD 20 | 0 | 0 | 0.05 | 0.05 | 0.2 | 0.05 | 0.05 | 0 |
| Wax | MichemLube 190 (35% solids) | 1 | 1 | 1 | 1 | 1 | 1 | 1 | 1 |
| Total % | | 100 | 100 | 100 | 100 | 100 | 100 | 100 | 100 |

The aqueous inkjet ink compositions were jetted using a Dimatix DMP2800 printer on different paper substrates, including Kodak photo paper, McCoy® gloss #100 and Xerox® Bold. A first set of test key parameters used were as follows: Drop mass=4.5-4.8 ng (i.e., about 4.5 ng), Drop velocity=6-7 m/s, frequency=5 kHz, voltage=16-20 V, printing temperature was 20° C. to 40° C. A second set of test key parameters used were as follows: Drop mass=8.5-9 ng (i.e., about 9 ng), Drop velocity=9-11 m/s, frequency=5 kHz, voltage=24-27 V, printing temperature was 20° C. to 40° C. The print parameter was a 600×600 dpi print. The measurement was done using a PIAS II instrument, which is a personal image analysis system with a digital loupe. The high-resolution optic module ~5 µm/ pixel was used which has a field view of ~3.2 mm×2.4 mm to measure the dot size and diameter. The results are shown in Table 4. Aqueous inkjet ink compositions made using the latex of Examples 1-3 passed continuous jetting for >10-30 minutes during which the faceplate was clean and the nozzles did not clog. The ink drops also maintained round and circular shapes.

The stability of the aqueous inkjet ink compositions in open air was studied with the visual assessment of the onset of structure formation, the state of gelation, and fully gelled ink. For each study, 4 grams of test ink(s) along with a control ink were dispensed in identical Pyrex Petri dishes (60 mm d, 10 mm h) in the lab space (32% relative humidity, 22° C.) and inspected every 30 minutes for a total test duration of 5 hours. At each inspection interval, ink dishes were gently swirled to assess the severity of structure formation.

The aqueous inkjet ink compositions were tested for wet rub resistance (20 double-rubs using wet Q-tip) (water fastness). A thin layer of each inkjet ink composition (wire-wound rods RDS 2.5) was coated on McCoy gloss #100 paper and then dried in a convection oven at 130° C. for 2 min. The numbers in Table 4 indicate the number of double-rubs (an average of 3 measurements) that were obtained before any removal of the ink was observed.

Gloss measurements were obtained for the aqueous inkjet ink compositions in order to determine gloss differential values. A BYK Gardner Micro Gloss meter (75°) was used for gloss measurements on coated paper substrates. Once the ink is printed on the paper substrate, the print is kept for 24 hours. The gloss at 75° is measured with the digital micro gloss meter. The print is then rubbed with a wipe thirty times and the gloss is measured again. The differential gloss before and after wiping thirty times is calculated. The lower the gloss differential the better the print robustness quality against rub.

TABLE 4

Printing Performance, Water Fastness, and Gloss Differential of Aqueous Inkjet Ink Compositions.

| Substrate | Ink of Example 9 (Latex of Example 1) at 4.5 ng | Ink of Example 9 (Latex of Example 1) at 9 ng | Ink of Example 11 (Latex of Example 2) at 4.5 ng | Ink of Example 11 (Latex of Example 2) at 9 ng | Ink of Example 14 (Latex of Comparative Example 5) at 4.5 ng | Ink of Example 14 (Latex of Comparative Example 5) at 9 ng |
|---|---|---|---|---|---|---|
| McCoy Gloss | Dot Diameter = 55.60 µm<br>Dot Circularity = 1.0<br>Mottle = 0.53<br>Graininess = 3.73<br>Line Width = 0.045 mm | Dot Diameter = 65.33 µm<br>Dot Circularity = 1.0<br>Mottle = 0.53<br>Graininess = 1.20<br>Line Width = 0.057 mm | Dot Diameter = 55.47 µm<br>Dot Circularity = 1.0<br>Mottle = 0.83<br>Graininess = 4.1<br>Line Width = 0.045 mm | Dot Diameter = 62.83 µm<br>Dot Circularity = 1.0<br>Mottle = 0.6<br>Graininess = 1.57<br>Line Width = 0.054 mm | Dot Diameter = 51.30 µm<br>Dot Circularity = 0.9<br>Mottle = 0.9<br>Graininess = 5.03<br>Line Width = 0.044 mm | Dot Diameter = 62.73 µm<br>Dot Circularity = 1.0<br>Mottle = 0.63<br>Graininess = 2.43<br>Line Width = 0.056 mm |
| SUW Matte | Dot Diameter = 55.67 µm<br>Dot Circularity = 1.0<br>Mottle = 0.8<br>Graininess = 2.07<br>Line Width = 0.047 mm | Dot Diameter = 64.90 µm<br>Dot Circularity = 1.0<br>Mottle = 0.7<br>Graininess = 2.03<br>Line Width = 0.058 mm | Dot Diameter = 55.73 µm<br>Dot Circularity = 1.0<br>Mottle = 0.73<br>Graininess = 3.13<br>Line Width = 0.050 mm | Dot Diameter = 67.60 µm<br>Dot Circularity = 1.0<br>Mottle = 0.57<br>Graininess = 1.23<br>Line Width = 0.060 mm | Dot Diameter = 54.60 µm<br>Dot Circularity = 1.0<br>Mottle = 0.7<br>Graininess = 3.87<br>Line Width = 0.046 mm | Dot Diameter = 64.73 µm<br>Dot Circularity = 1.0<br>Mottle = 0.63<br>Graininess = 2.73<br>Line Width = 0.059 mm |
| McCoy Gloss | OD = 1.053<br>L* = 35.60<br>a* = 1.44<br>b* = −0.04 | OD = 1.417<br>L* = 23.10<br>a* = 0.56<br>b* = −1.20 | OD = 1.095<br>L* = 33.91<br>a* = 1.66<br>b* = 0.048 | OD = 1.416<br>L* = 23.07<br>a* = 1.06<br>b* = −0.86 | OD = 0.901<br>L* = 41.97<br>a* = 1.52<br>b* = −0.69 | OD = 1.276<br>L* = 27.55<br>a* = 0.79<br>b* = −1.07 |
| SUW Matte | OD = 1.139<br>L* = 32.12<br>a* = 1.95<br>b* = 2.84 | OD = 1.424<br>L* = 22.88<br>a* = 0.58<br>b* = −1.28 | OD = 1.065<br>L* = 35.10<br>a* = 1.33<br>b* = 1.24 | OD = 1.545<br>L* = 19.31<br>a* = 1.54<br>b* = 0.55 | OD = 0.887<br>L* = 42.63<br>a* = 1.08<br>b* = 0.28 | OD = 1.326<br>L* = 25.87<br>a* = 0.89<br>b* = −0.18 |
| Water Fastness Double Rubs (Average of 3 measurements) | 16 | 22 | 15 | 19 | 10 | 12 |
| Gloss 75° (McCoy) | Gloss 75° (before rub) | 94.67 | Gloss 75° (before rub) | 97.47 | Gloss 75° (before rub) | 93.47 |
| | Gloss 75° (after rub) | 98.4 | Gloss 75° (after rub) | 100.67 | Gloss 75° (after rub) | 101.13 |
| | Gloss Differential | 3.73 | Gloss Differential | 3.2 | Gloss Differential | 7.66 |

As shown in Table 3 (Examples 1-4), the incorporation of the amphiphilic dioxane/dioxolane monomer did not have any negative impact on the microemulsion polymerization, the monomer emulsification step, and the final conversion. Also, the size distributions of resin particles (PDI<0.05) and colloidal stability after accelerated aging test (3 days @ 60° C.) were preserved.

Notably, the latex/resin particles of Examples 1-4 exhibited pH responsivity. For example, the resin particles of the latex of Example 3 exhibited a 25% increase in $D_{50}$ particle size as pH increased from 3 to 8. Similarly, the latex of Example 3 exhibited a nearly 5 times increase in viscosity. A tuning fork vibration viscometer (Cole-Parmer) was used to measure viscosity. At a solids content of 40%, room temperature, and a pH of 3, the viscosity was 37 cP; at a solids content of 34.4%, room temperature, and a pH of 8, the viscosity increased to 176 cp. At the same time, the colloidal stability and particle size distribution of Examples 1-4 were preserved as pH was adjusted.

Aqueous inkjet ink compositions of Examples 8-12 (made using the latex/resin particles of Examples 1-3) exhibited excellent printing performance, showing improved jetting (no misdirectionality and satellites, jetted for >30 minutes), latency, and decap time. More specifically, print images of aqueous inkjet ink compositions Examples 10 and 11 (made using the latex/resin particles of Example 2) showed good circularity and lines and solid blocks showed similar or better surface coverage than Comparative Examples 13-15.

In addition, the use of the dioxane/dioxolane monomer drastically improved the mechanical properties of printed ink as evidenced by the increase in water fastness (wet rub resistance) and reduced gloss differential. (See Table 4.) This is particularly surprising since the $T_g$ of the resin particles in Examples 9 and 11 are high (80° C. and 67° C., respectively). High $T_g$ values are normally associated with poor wet rub resistance and high gloss differential as is the case with Comparative Example 14.

Finally, the use of the dioxane/dioxolane monomer greatly improved open-air stability of the aqueous inkjet ink compositions. Aqueous inkjet ink compositions Examples 8-12 (made from latex/resin particles of Examples 1-3), showed extended flow time and delay in onset of structure formation (gelling) once they were exposed to open-air flow. Specifically, they showed an improvement of at least 1-2 hours in the start and progression of gelling. This is more than a 100% improvement over Comparative Examples 13-15. This is particularly surprising since the resin particles of Examples 13 and 14 comprise hydrophilic hydroxyethyl acrylate and Example 15 comprises a water-soluble resin (PEG 4000). These components were expected to inhibit gelling as compared to the amphiphilic dioxane/dioxolane monomer of Examples 8-12.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A latex comprising water and resin particles comprising a polymerization product of reactants comprising glycerol formal (meth)acrylate; styrene; an alkyl (meth)acrylate; methacrylic acid, styrene sulfonic acid, or both methacrylic acid and styrene sulfonic acid; a reactive surfactant; a multifunctional monomer; and optionally, a chain transfer agent, an initiator, or both the chain transfer agent and the initiator,
    wherein the resin particles have a room temperature viscosity at a solids content of about 30% and at about pH 3 in a range of from about 10 cP to about 100 cP, and further wherein the latex is free of any other polymer other than that provided by the resin particles.

2. The latex of claim 1, wherein the resin particles have a Dso particle size that is dependent upon a pH of the latex.

3. The latex of claim 2, wherein the Dso particle size at about pH 8 is larger than the Dso particle size at about pH 3.

4. The latex of claim 3, wherein the Dso particle size at about pH 8 is at least about 15% larger.

5. The latex of claim 1, wherein the resin particles have a Dso particle size at about pH 3 of no greater than about 100 nm.

6. The latex of claim 1, wherein the latex has a room temperature viscosity at a solids content of about 30% that is dependent upon a pH of the latex.

7. The latex of claim 6, wherein the room temperature viscosity at the solids content of about 30% and at about pH 8 is greater than the room temperature viscosity at the solids content of about 30% and at about pH 3.

8. The latex of claim 7, wherein the room temperature viscosity at the solids content of about 30% and at about pH 8 is about 2 times greater.

9. The latex of claim 1, wherein the resin particles have a glass transition temperature $T_g$ in a range of from about 50° C. to about 100° C.

10. The latex of claim 1, wherein the glycerol formal (meth)acrylate is present at an amount of from about 2 weight % to about 18 weight %;
    the styrene and the alkyl (meth)acrylate are present, together, at an amount of from about 70 weight % to about 97 weight %;
    the methacrylic acid, the styrene sulfonic acid, or both the methacrylic acid and the styrene sulfonic acid, are present, together, at an amount of from about 2 weight % to about 20 weight %; and
    the multifunctional monomer is present at an amount of from about 0.001 weight % to about 1 weight %,
    wherein the amounts are as compared to a total weight of monomers in the resin particles, excluding the reactive surfactant.

11. The latex of claim 10, wherein the resin particles consist of the polymerization product of the reactants and the reactants consist of the glycerol formal (meth)acrylate; the styrene; the alkyl (meth)acrylate; the methacrylic acid, the styrene sulfonic acid, or both the methacrylic acid and the styrene sulfonic acid; the reactive surfactant; the multifunctional monomer; and optionally, the chain transfer agent, the initiator, or both the chain transfer agent and the initiator.

12. A latex consisting of water and resin particles, the resin particles comprising a polymerization product of reactants comprising glycerol formal (meth)acrylate and an additional monomer.

13. The latex of claim 12, wherein the resin particles have a room temperature viscosity at a solids content of about 30% and at about pH 3 in a range of from about 10 cP to about 100 cP.

14. The latex of claim 13, wherein the resin particles consist of the polymerization product of the reactants and the reactants consist of the glycerol formal (meth)acrylate;
    styrene as the additional monomer;
    an alkyl (meth)acrylate;
    methacrylic acid, styrene sulfonic acid, or both methacrylic acid and styrene sulfonic acid;
    a reactive surfactant;
    a multifunctional monomer; and
    optionally, a chain transfer agent, an initiator, or both the chain transfer agent and the initiator.

* * * * *